United States Patent [19]
Taute

[11] Patent Number: 5,910,090
[45] Date of Patent: Jun. 8, 1999

[54] DC DRIVE POSITIONING SYSTEM

[75] Inventor: Carl J. Taute, Merrifield, Minn.

[73] Assignee: Riverwood International Corporation

[21] Appl. No.: 08/868,204

[22] Filed: Jun. 3, 1997

Related U.S. Application Data

[63] Continuation-in-part of application No. 08/866,286, May 30, 1997, abandoned
[60] Provisional application No. 60/018,883, May 31, 1996, abandoned.

[51] Int. Cl.[6] .............................. B65B 57/00; B65B 59/00
[52] U.S. Cl. ................................ 53/504; 53/48.1; 53/201; 53/257; 53/507; 493/478; 493/479
[58] Field of Search ................................ 53/504, 507, 52, 53/77, 201, 48.1, 257; 493/479, 478

[56] References Cited

U.S. PATENT DOCUMENTS

| 5,057,068 | 10/1991 | Capdeboscq | 493/478 |
|---|---|---|---|
| 5,157,903 | 10/1992 | Nakashima et al. | 53/504 |
| 5,517,798 | 5/1996 | Klopfenstein | 493/479 X |
| 5,626,002 | 5/1997 | Ford et al. | 53/48.1 X |

*Primary Examiner*—James F. Coan
*Attorney, Agent, or Firm*—Skinner and Associates; Steve McLary

[57] ABSTRACT

An apparatus for positioning a guide slidably mounted on a machine wherein the guide is driven by a lead screw turned by a DC motor through a worm drive gearhead. The DC motor is controlled by a programmable logic controller (PLC) with input from an operator interface and feedback from a hollow shaft encoder attached directly to a shaft extending from the lead screw. Ladder logic programming in the PLC directs the motor to run or stop based on comparing a target position for the guide with the current position based on electrical signals from said encoder. A home position for each guide corresponds to the guide's position when it has moved fully outward encountering an outward stop. The programming also allows manual jogging of the guide through the operator interface. The programming takes up mechanical backlash in the apparatus on each move by overshooting the target position a predetermined amount when a move is made in an outward direction. Moves in an inward direction proceed directly to the target position. A changeover cycle moves all guides to positions selected from previously stored positions.

23 Claims, 10 Drawing Sheets

SINGLE AXIS

DC DRIVE POSITIONING SYSTEM

CROSS-REFERENCE TO RELATED APPLICATINS, IF ANY

This application is a continuation-in-part of U.S. patent application Ser. No. 08/866,286 entitled DC Drive Positioning System, filed May 30, 1997 in the name of the same inventors, Application Ser. No. 08/866,286, now abandoned, which claims priority, under 35 U.S.C. 119(e), of provisional U.S. patent application Ser. No. 60/018,883, filed May 31, 1996, abandoned.

STATEMENT REGARDING FEDERALLY SPONSORED RESEARCH OR DEVELOPMENT

Not applicable.

REFERENCE TO A MICROFICHE APPENDIX, IF ANY

Not Applicable. BACKGROUND OF THE INVENTION

1. Field of the Invention

The present invention relates, generally, to automated machinery control systems. More particularly, the invention relates to a control system for an automated packaging machine. Specifically the invention relates to a control system for positioning mechanisms of an automated packaging machine.

2. Background Information

In the past, various devices and methods have been used or proposed to track and control the position of various components of an automated machine system and/or of articles being manipulated by such systems. However, known devices and methods have significant limitations and shortcomings. In the area of automated packaging machines, the positions of many parts of the machine are adjustable to accommodate different size and shape articles being packaged and different packages. The prior art for positioners on packaging machines includes servo-motor based positioners or manually operated positioners. The servo-motor based positioners, though useful and accurate, are expensive. The manually operated positioners are less expensive but also less accurate and more time consuming to adjust. The effectiveness of a manual adjustment can also depend on the skill of the person making the adjustment.

In the past a particular packaging machine could be dedicated to one size article or one pack size. However, since packaging machines have become more sophisticated and consequently more expensive, there is a need for one machine to have the capability of processing a wide range of article sizes and pack sizes. Changing the machine to accommodate the different arrangements should be simple, fast, and accurate. Such a machine requires relatively frequent changing and repositioning of many components of the machine. The prior art manual method of adjusting the position of these components is typically a screw shaft with a crank or wheel on the end of the shaft. When a change in position is necessary, the wheel or crank is turned to move the component to the desired position. The accuracy of an adjustment depends on the skill of the person making the adjustment. Screws have backlash and the operator must remember to take up the backlash when trying to repeat a position adjustment. It can take significant time for an operator to make all the adjustments necessary on a machine to change from one configuration to another. It is desirable to have an automated system for changing positions so that positional information for each desired setting can be stored in a computer and all adjustments needed can be accomplished accurately, simultaneously and rapidly, preferably with the touch of a single button.

One way to accomplish this is to use servo motors to turn the adjustment screws. Servo motors are used on packaging machines to control mechanisms that move continuously and which must be synchronized with other mechanisms for the machine to properly operate. Servo motors and their controllers are very accurate and fast, but also very expensive costing approximately $5000 per axis. While they are necessary for the synchronized continuous motion axes, they are overkill for a position adjustment axis which is only moved during a change in machine configuration.

Despite the need in the art for a positioning system for automated packaging machines which overcomes the disadvantages, shortcomings and limitations of the prior art, none insofar as is known has been developed. Applicant's invention provides an automated positioning system which overcomes the limitations and shortcomings of the prior art. Accordingly, it is an object of the present invention to provide an automated positioning system which is less expensive than one using servo motors. It is another object of the present invention to provide an automated positioning system which is faster and at least as accurate as one which is manually adjusted. It is still another object of the invention to provide an automated positioning system which can easily be retrofitted on existing manually operated systems.

BRIEF SUMMARY OF THE INVENTION

The present invention provides an automated, accurate, inexpensive system for positioning elements, such as guides, on a processing machine using a lead screw driven by a DC drive motor through a worm drive gearhead. Guides are structural members of a machine which direct articles being processed into proper position as they progress through the machine. On a packaging machine, guides may position cartons and articles being packaged on conveyors. In a system of the present invention, an element to be positioned is mounted on slide rails. A nut threadably engaging a lead screw is attached to the element. The lead screw is oriented parallel to the slide rails and drives the nut and element along the slide rails. Outward and inward stops at the ends of the lead screw limit the travel of the nut on the lead screw.

The lead screw has a shaft extending from it into a coupling which connects to a gearhead attached to a DC motor. The coupling may be a direct connection, such as a U-joint, or it may be indirect such as through timing pulleys and a belt or sprockets and a chain. The worm drive gearhead has an output with reduced speed and increased torque relative to the motor output. The gear ratio and motor size are such that when the nut reaches one of stops, the motor stalls out without damaging the nut, lead screw, or stops. A hand wheel may be provided on the motor shaft to facilitate manual turning if necessary.

The DC motor is controlled by a programmable logic controller (PLC) through a DC Drive using feedback from an encoder and inputs from an operator interface. The encoder is mechanically connected to shaft extending from the lead screw and electrically connected to the PLC. The encoder tells the PLC the rotational position of the lead screw through many revolutions by sending a number of counts per revolution. The encoder is preferably a hollow shaft encoder which attaches directly to the shaft thereby needing no couplings, such as timing belts and pulleys, between the encoder and shaft. Such direct connection simplifies the system and improves reliability and accuracy.

The PLC has ladder logic programming steps which include directing the motor to run or stop based on comparing a current position of the element with a target position. The current position is calculated based on electrical signals from the encoder. The programming also allows manual jogging of the element by changing the target position in one-millimeter or ten-millimeter increments as selected by the operator through the operator interface. The programming has at least one step to define a home position for the element. The home position corresponds to the position of the element when the element has moved fully outward and the outward stop is encountered. The programming also has at least one step to take up mechanical backlash in the apparatus by overshooting the target position by a predetermined amount when a move is made in an outward direction. Moves in an inward direction proceed directly to the target position. The system runs slow enough that target positions are reached with no overshoot, so the control system is stable.

A plurality of elements are controlled by a single PLC, and positions for all of the elements for different runs of the machine requiring different settings are stored in a database. A single changeover button on the operator interface can recall settings for a particular run and direct the elements to go to those positions. This makes adjusting the elements during a machine changeover for another run very easy, accurate, and repeatable.

The features, benefits and objects of this invention will become clear to those skilled in the art by reference to the following description, claims and drawings.

DETAILED DESCRIPTION

Figure 1A:
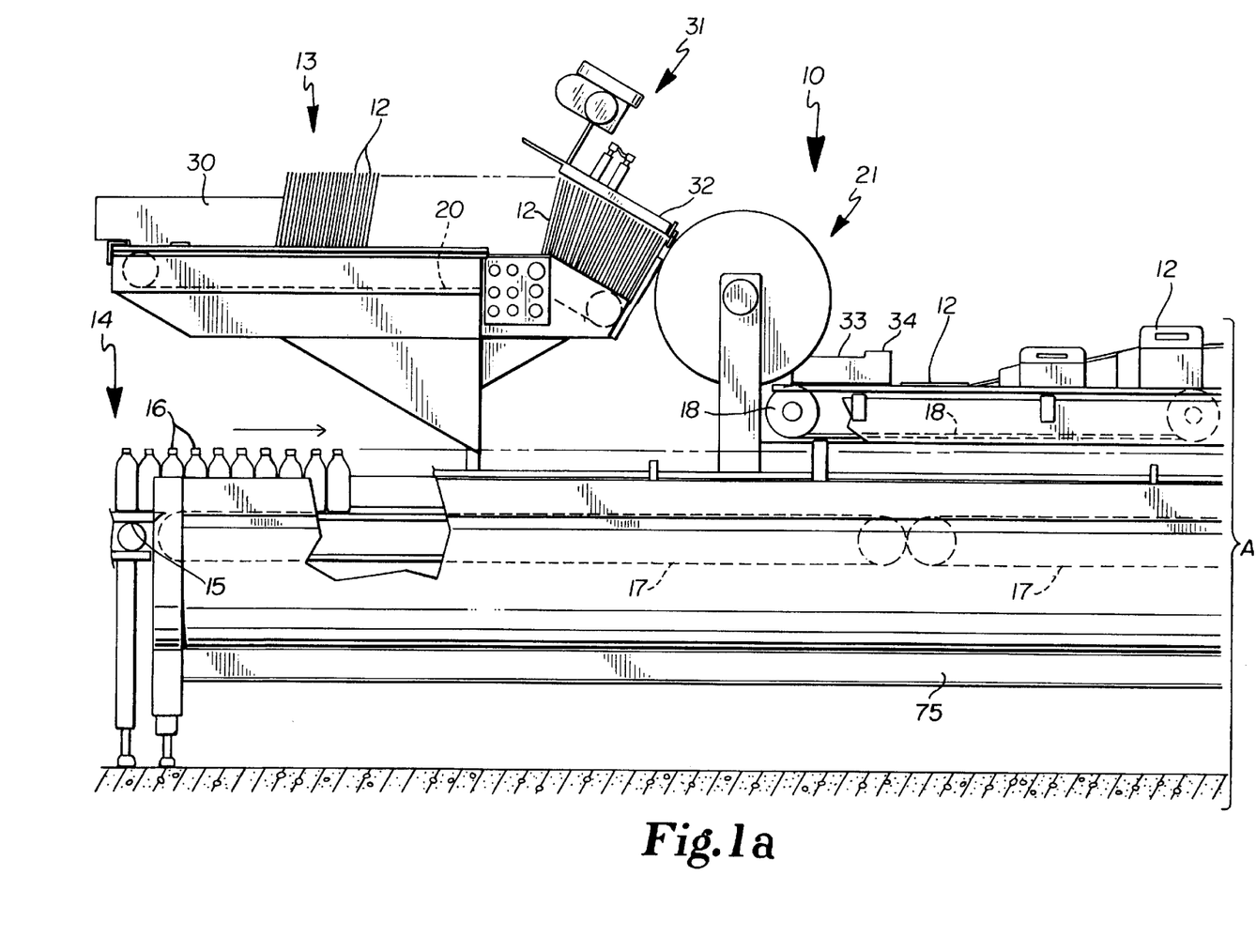
FIGS. 1a, 1b and 1c are a side view of a packaging machine which uses a DC drive positioning system of the present invention.
Figure 1B:
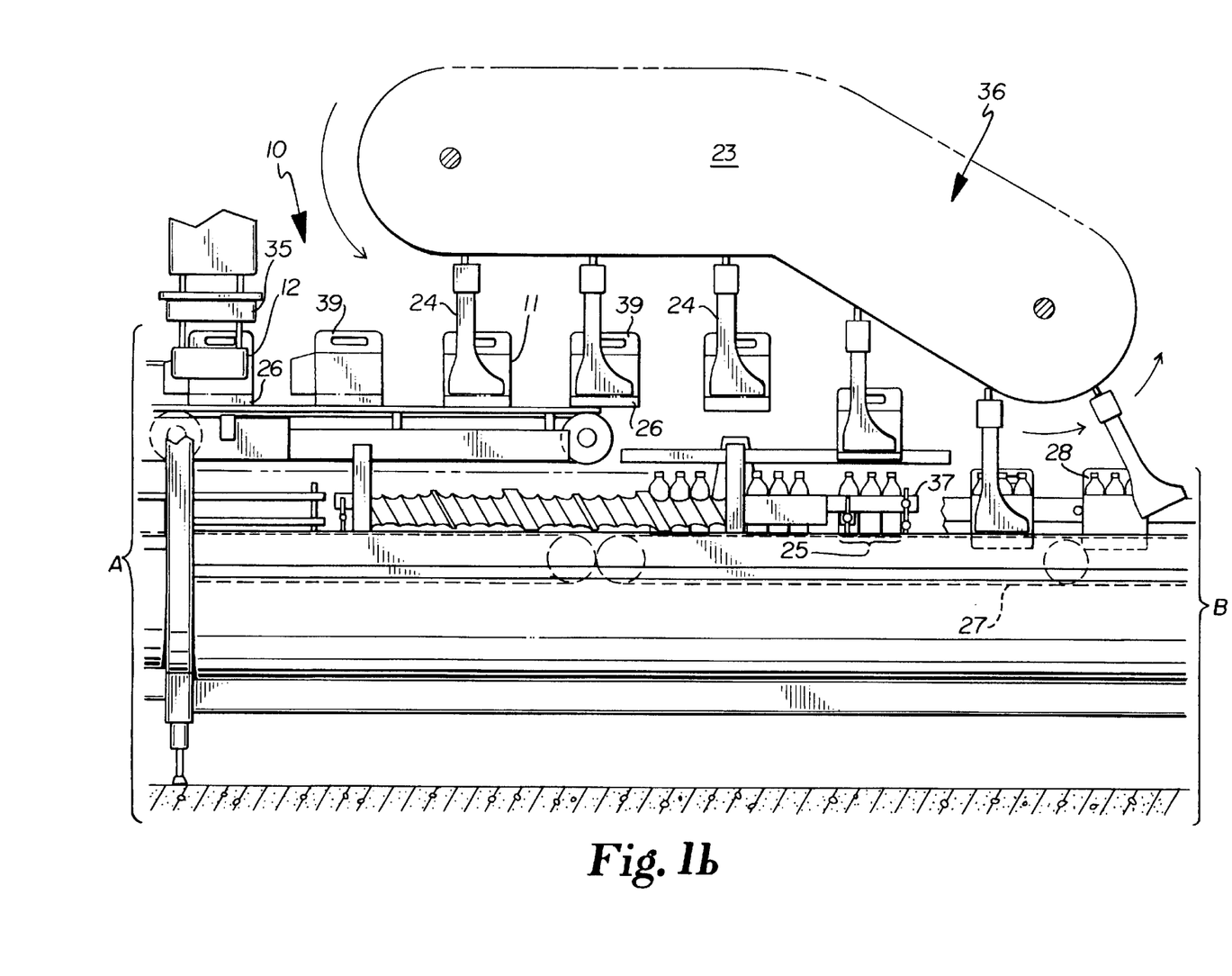
Figure 1C:
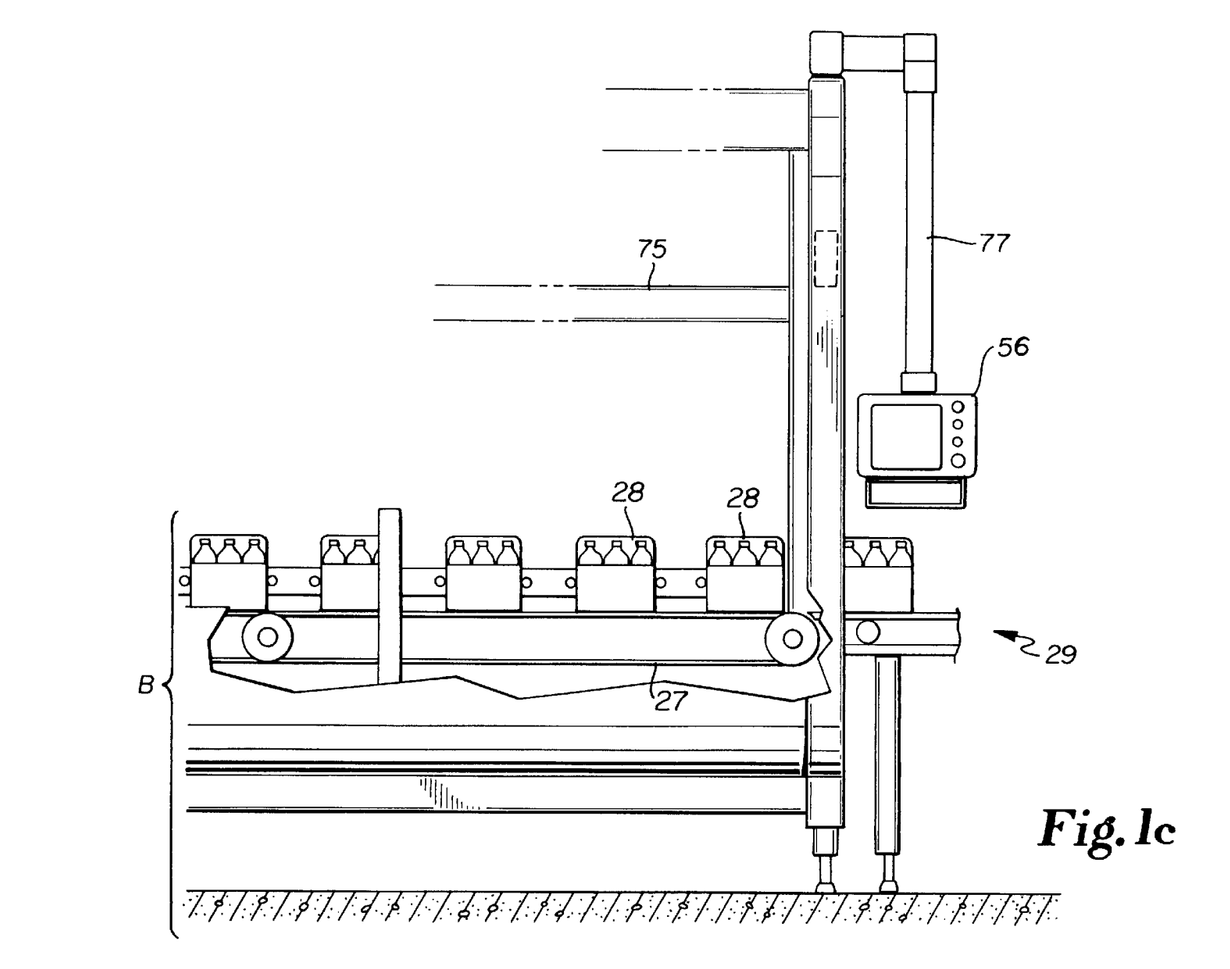

Referring to FIGS. 1a, 1b and 1c, a typical packaging machine 10 is illustrated showing various components which can have their position changed for different machine configurations. The functioning of packaging machine 10 is disclosed in U.S. Pat. No. 5,626,002 issued on May 6, 1997. Said patent being assigned to Riverwood International Corporation, the assignee of this application. The above patent is hereby incorporated by reference.

In the packaging machine 10 for placing groups of articles, such as bottles or cans, within individual cartons 11, the cartons are in a collapsed form, called a blank 12, stacked on a carton magazine 13 at the in-feed end 14 of the packaging machine 10. An in-feed conveyor 15 feeds articles, such as bottles 16 into machine 10. One or more conveyors 17 moves bottles 16 through the machine where they are grouped and spaced to be joined with cartons 11. A conveyor 20 moves carton blanks 12 along the carton magazine 13 where a carton feeder 21 moves them to a portion of machine 10 which erects them and transfers them into an overhead carton carrier 23 which has arms 24 which grip carton blanks 12, opens them into cartons 11 and places them onto grouped bottles 25. A bottom flap or flaps 26 is then closed on cartons 11. A discharge conveyor 27 moves the packaged articles 28 out of discharge end 29 of machine 10 to an area where they are consolidated for shipping.

Machine 10 can process a variety of bottle sizes and pack configurations (four-pack six-pack, eight pack, etc.). For each different size and style bottle, and each different pack size, a different carton is used. The numerous different bottles and cartons require that position adjustments be made on up to eight elements of machine 10 for each unique combination of bottles and carton processed. The present invention provides a reliable, accurate, fast and cost effective apparatus for making those adjustments using, for example, a conventional DC drive, DC motor, gearhead, lead screw, and encoder, for each axis to be adjusted. A programmable logic controller connected to an operator interface 56 for machine 10 controls each axis.

FIGS. 1a, 1b and 1c show the location of the eight elements on machine 10 which are adjusted by the positioner of the present invention. The magazine width 30 adjustment is located on one side of the carton magazine 13. Carton blanks 12 are stacked substantially vertical on a conveyor 20 on carton magazine 13. The magazine width adjustment is positioned to properly locate carton blanks laterally on conveyor 20.

The carton clip height 31 adjustment is located just forward of the magazine width adjustment 30. It raises and lowers a guide 32 which contacts top edges of carton blanks 12 as they are processed down incline 22.

At the bottom of incline 22 is the carton flap guide 33 followed by the carton handle guide 34. Both of those guides are adjusted laterally to properly position carton blanks 12 oriented horizontally on conveyor 18 which takes them to the overhead carton carrier 23.

Before the carton blanks 12 arrive at the overhead carton carrier 23, they are erected to a vertical orientation. The pre-opener guide 35 is raised or lowered to contain the top of the handle 39 on carton blanks 12 when the carton blanks 12 are vertical.

On the overhead carton carrier 23, carton blanks 12 are pulled open to form cartons 11. The arms 24 which open the carton blanks 12 must move just the right amount for the width of carton 11, which depends on the size bottle being processed. An adjustable opening cam 36 located inside overhead carton carrier 23 controls how much the arms 24 open the carton blanks 12.

The discharge conveyor 27 moves the packaged articles 28 out of machine 10 to an area where they are consolidated for shipping. The lateral position of discharge conveyor 27 is adjusted to accommodate different width packages.

An accessory rail 37 extends all along machine 10 and forms an outer guide of a channel for bottles 16 as they are processed through machine 10. A stationary guide (not shown) forms an inner guide of the channel, and a center guide (not shown) divides the channel into two lanes. As the bottle diameter changes, the accessory rail 37 and the center guide move laterally to accommodate the different size bottles. The center wall moves at half the speed that the accessory rail 37 moves so it is always in the middle of the channel as the channel width change.

Figure 2:
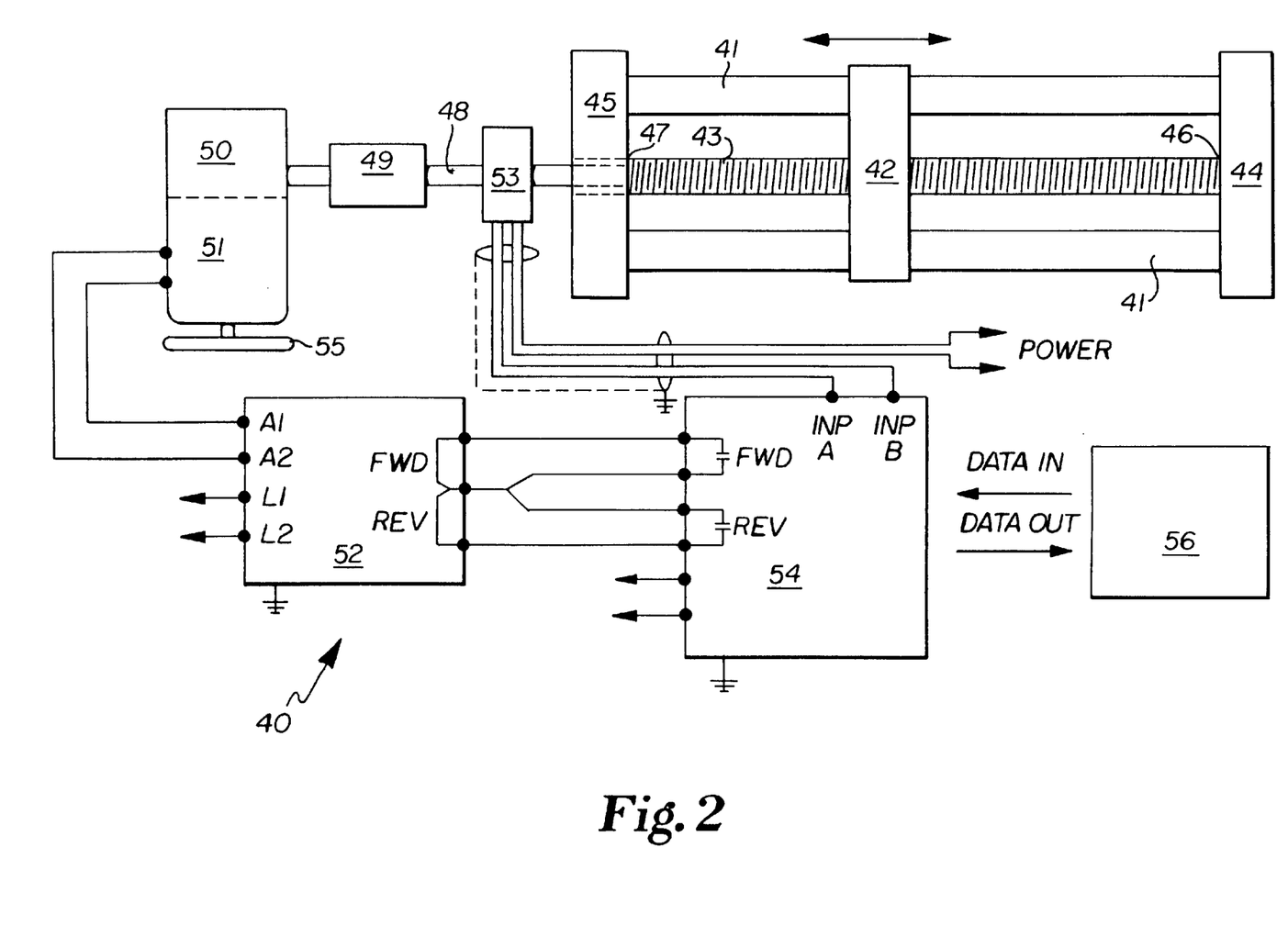
FIG. 2 is a schematic diagram of a DC drive positioning system of the present invention.

FIG. 2 schematically illustrates the DC drive positioning system 40 used on all of the apparatus above. Slide rails 41 hold an element to be positioned and/or nut 42 which travel linearly along them. Lead screw 43 is oriented parallel to rails 41. Nut 42 is threadably engaged with lead screw 43 which drives nut 42 along rails 41. Stops 44 and 45 at ends 46 and 47 of lead screw 43 limit the travel of nut 42 on lead screw 43. Any element to be positioned is attached to nut 42 and is thereby positioned by rotation of lead screw 43. Lead screw 43 typically has a pitch of two to six millimeters per revolution.

Lead screw 42 has a shaft 48 extending from end 47 into a coupling 49 which connects to a gearhead 50 attached to a DC motor 51. Coupling 49 may be a direct connection, such as a U-joint, or it may be indirect through timing pulleys and a belt, or sprockets and a chain. Gearhead 50 typically has an internal worm and worm gear which converts the output of DC motor 51 by reducing the number of revolutions and increasing the output torque at coupling 49. The gear ratio and motor size are such that when nut 42 reaches one of stops 44 or 45, the motor 51 stalls out without damaging nut 42, lead screw 43, or stops 44 or 45. Motor 51 is typically ⅛ to ⅓ horsepower. When motor 51 stops under those conditions, a high current condition in motor 51 is safely limited by DC drive 52, and lack of encoder 53 motion feedback is sensed by programmable logic controller (PLC) 54 and power to motor 51 is stopped. A hand wheel 55 may be provided on motor 51 to facilitate manual turning if necessary.

Encoder 53 is mechanically connected to shaft 48 and electrically connected to PLC 54. It tells the PLC the rotational position of lead screw 43 through many revolutions by sending a number of counts per revolution. The encoders used for these positioners operate in quadrature on three pulses per revolution resulting in twelve counts per revolution, including direction of rotation determination. With a screw pitch of 5 mm/revolution, each count from the encoder corresponds to 0.4167 millimeters of linear movement of the device to be positioned. The positional accuracy of the system 40 is within one millimeter. Greater accuracy or precision is not needed for machine 10 on which system 40 is used. However, for other applications, greater accuracy and/or precision can be readily obtained by using a lead screw with a finer pitch, and/or an encoder providing more pulses per revolution, and/or increasing the ratio of revolutions of the encoder to that of the screw.

Encoder 53 is preferably a hollow shaft encoder which attaches directly to shaft 48. In the preferred embodiment there are no couplings, such as timing belts and pulleys, between the encoder 53 and shaft 48. Such direct connection simplifies the system and improves reliability and accuracy. It also allows quick conversion to a manual system by deletion of encoder, motor, and gearhead and addition of handwheel and hollow shaft (or other) read-out mechanism.

The programmable logic controller (PLC) 54 controls the rotation of motor 51, either forward or reverse, through DC drive 52 based on inputs from operator interface 56 and encoder 53. DC drive 52 and PLC 54 have simple electrical connections. DC drive 52 has two outputs A1 and A2 to motor 51, two power input lines L1 and L2, a ground connection, and three connections for the forward and reverse signal wires from the PLC 54. PLC 54 has two power input lines, L1 and L2, a ground connection, two inputs A and B from encoder 53, and two outputs for the forward and reverse signals to the DC drive. There is also a data transfer connection between PLC 54 and operator interface 56.

DC drive 52 can make motor 51 run forward or reverse on commands from PLC 54. Because of the gear ratio in gearhead 50 and the relatively slow speed of motor 51, screw 43 turns slowly enough that target positions are reached with no overshoot. It takes ten to fifteen seconds for an axis to move form one position to another on a changeover to different cartons, but that length of time is inconsequential during changeover when other operations take considerably longer. There is no need to move to a position faster. To do so would require more powerful motors and stronger stops or additional safety devices to prevent damage from more powerful motors running the apparatus to the stops.

When a move is made to change position of a device attached to nut 42, the PLC 54 has a programmed step to remove any backlash in the mechanical system by always approaching the target setting from the same direction at the end of the move regardless of which direction nut 42 has to move to change position. Thus, when a position change requires movement in one direction, the target is approached with no overshoot. When a position change requires movement in the other direction, the target is overshot and then approached from beyond it. With targets always approached from the same direction, any mechanical backlash in a particular positioner is nullified. Any vertical axis with backlash should be set up for "last move up" so gravity is used to work the backlash out of the axis.

Figure 3:
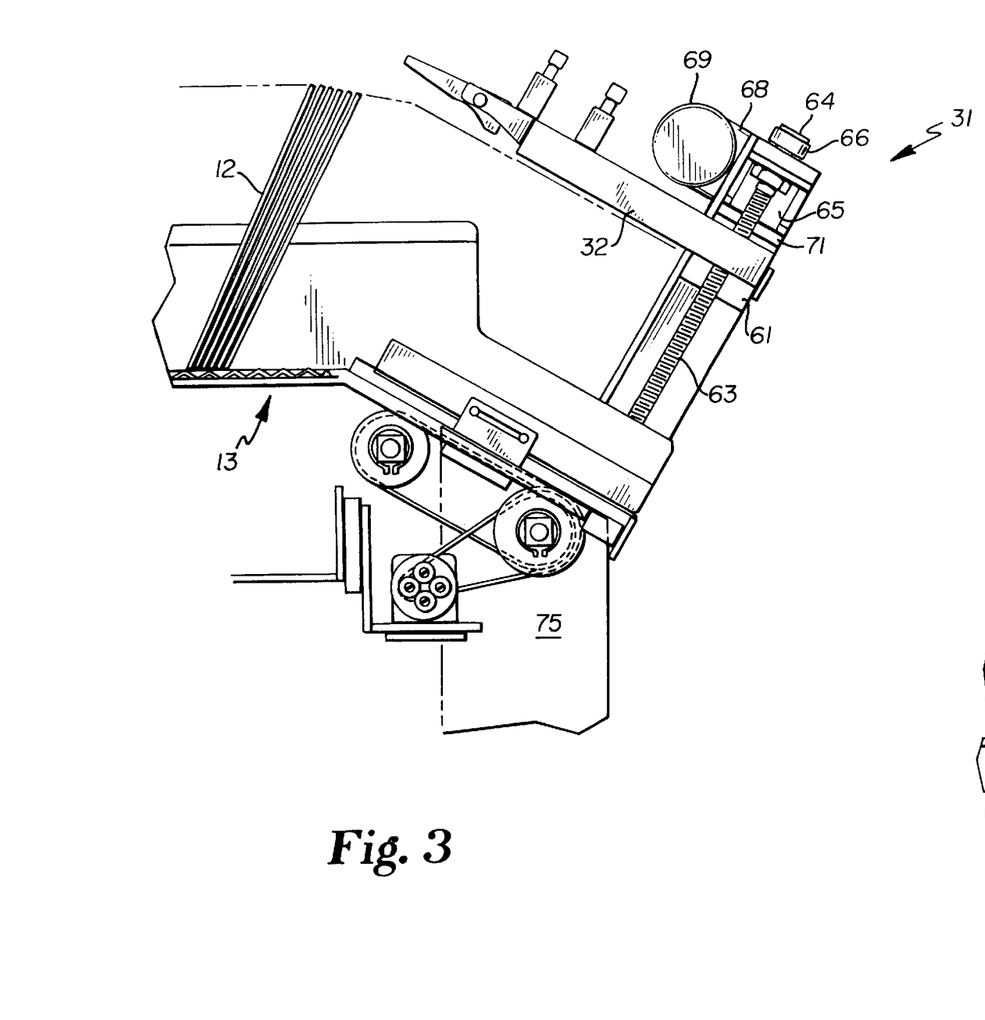
FIG. 3 is a side detailed view of one embodiment of the DC drive positioning system used for the carton clip height adjustment on the packaging machine of FIG. 1.
Figure 4:
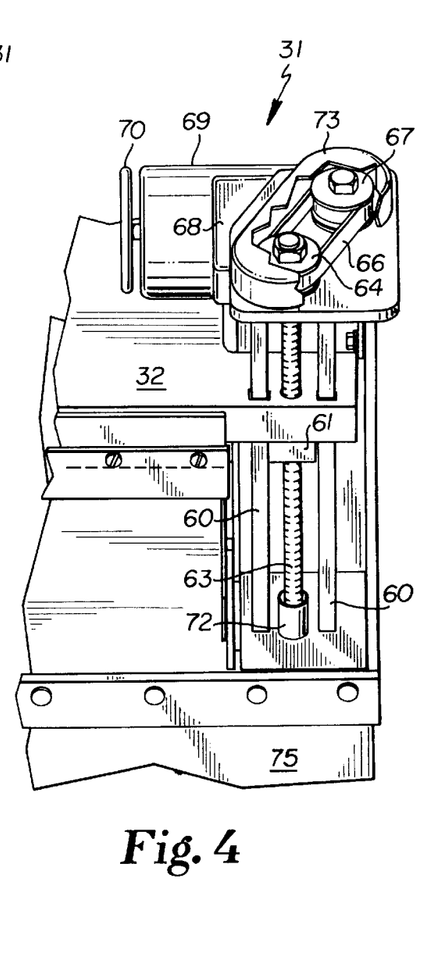
FIG. 4 is an end view of a portion of the mechanism shown in FIG. 3.

FIGS. 3 and 4 show detailed views of the carton clip height 31 positioner mechanism located above the carton magazine 13. Guide 32 moves substantially vertically on slides 60 attached to frame 75. Guide 32 has nut 61 attached which runs on lead screw 63 which drives guide 32. Lead screw 63 is driven by a first pulley 64 attached to the lead screw 63. A hollow shaft encoder 65 is also attached to lead screw 63 and signals the rotational position of lead screw 63 through many revolutions. A drive belt 66 transfers torque to first pulley 64 from a second pulley 67 attached to the output of a gearhead 68, which has an input driven by DC motor 69. Gearhead 68 has an internal worm and worm gear (not shown) which converts the output of DC motor 69 by reducing the number of revolutions and increasing the output torque at second pulley 67. Hand wheel 70 is attached to the shaft (not shown) of motor 69 to allow manual adjustment of the carton clip height 31 mechanism. An upper stop 71 limits the upward travel of nut 61 and guide 32, and a lower stop 72 limits their downward travel. Lower stop 72 may be a length of cylinder installed over screw 63. Guard 73 covers pulleys 64 and 67 and belt 66.

Figure 5:
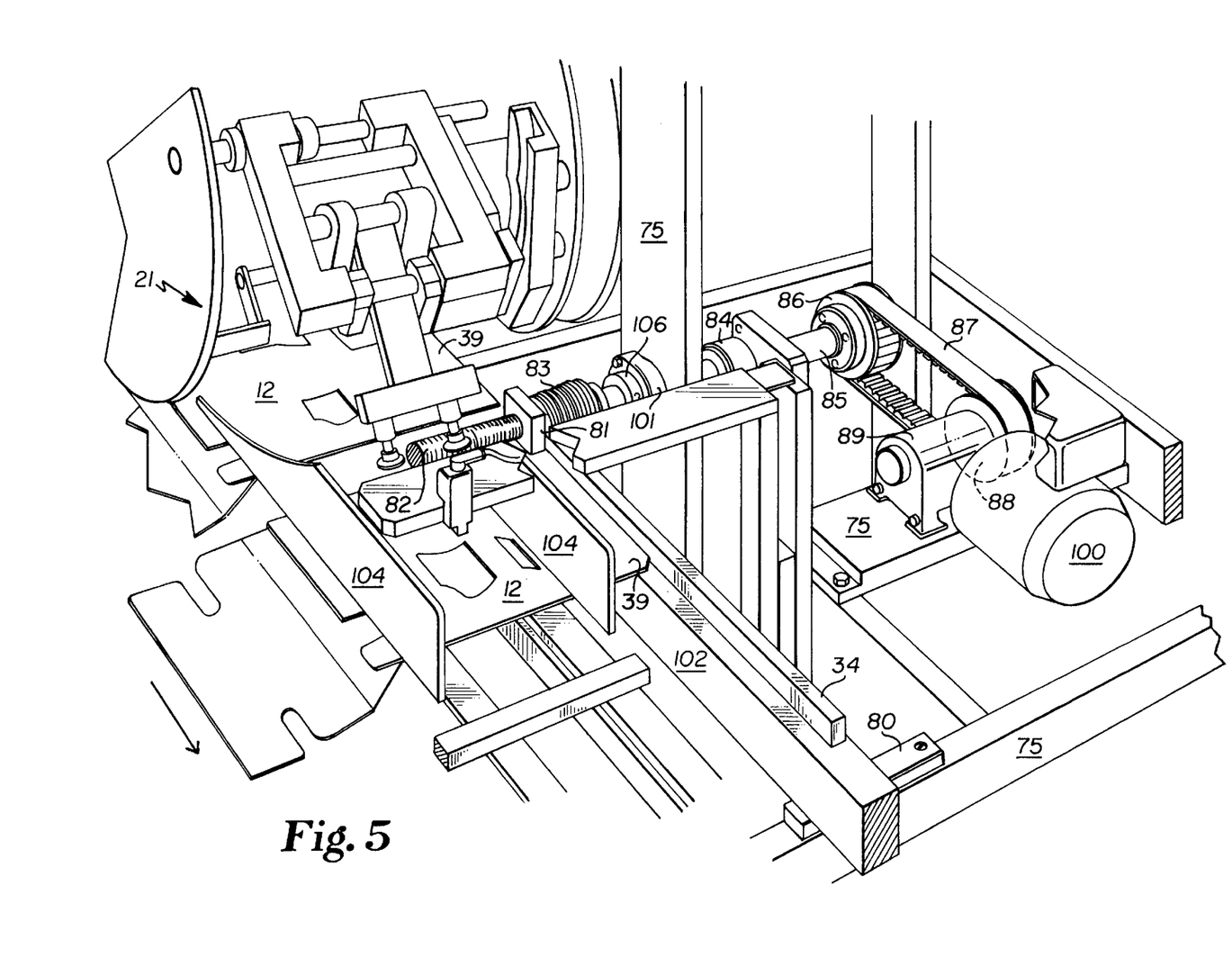
FIG. 5 is a detailed view of another embodiment of the DC drive positioning system used for the carton handle guide on the packaging machine of FIG. 1.

FIG. 5 shows a detailed view of the DC drive positioning system used for the carton handle guide 34. Carton blanks 12 are moved by carton feeder 21 onto a conveyor (not shown) and a carton support 102 where they are properly positioned by carton handle guide 34 and carton flap guide 33 (not shown) which are moved horizontally. Carton hold down members 104 keep carton blanks 12 flat. Handles 39 of carton blanks 12 butt against carton handle guide 34, which is attached to carton support 102, as carton blanks 12 move through machine 10 in the direction indicated. Carton support 102 with handle guide 34 moves on slide rails 80, one of which is shown, attached to frame 75. Nut 81 is attached to carton support 102 and handle guide 34 and threadably engages lead screw 82 which is partially enclosed in bellows 83. Shaft 85 is attached to lead screw 82 and is supported by bearings 101, one of which is shown, attached to frame 75. Also enclosed by bellows 83 is a cylindrical tube segment (not shown) over screw 82 which becomes sandwiched between nut 81 and stop 106 when carton support 102 and handle guide 34 are moved to the maximum outward position. The outward travel limit of handle guide 34 can be changed by replacing the tube segment with one of a different length. Encoder 84 is attached to shaft 85 as is timing pulley 86. Timing belt 87 couples pulley 86 to pulley 88 which is driven by motor 100 through gearhead 89. Motor 100 and gearhead 89 are also mounted on frame 75.

Figure 6:
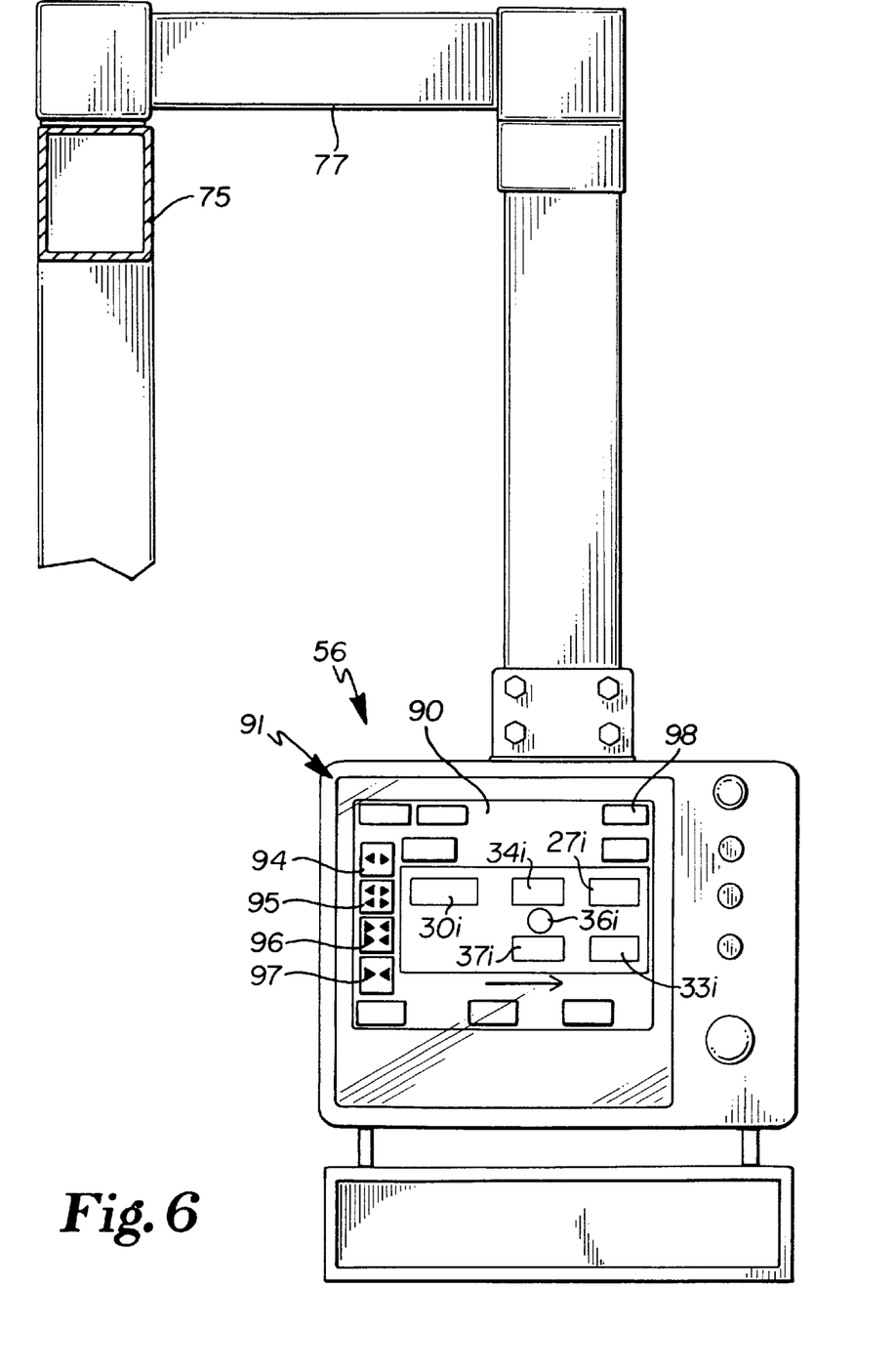
FIG. 6 is an illustration of the operator interface of the machine of FIG. 1. The screen on the operator interface is used to set the position of the several positioners used on the packaging machine.

Referring to FIG. 6, an operator controls machine 10 through a computerized operator interface (56 in FIG. 1) which is mounted on a pivoting arm 77 attached to frame 75 of machine 10. The operator interface 56 has a screen 90 which displays pertinent information about the machine status. One or more of the screen displays is for the status and adjustment of the various positioners on machine 10. One positioner adjustment screen display 91 illustrated in FIG. 6 shows iconic buttons for six of the eight positioner axes used on machine 10: 30I for magazine width, 34I for carton handle guide, 27I for discharge conveyor, 36I for carton opening cam, 37I for accessory rail, and 33I or carton flap guide. These six axes are all adjusted laterally into or out of the machine. The arrow on screen display 91 indicates product flow direction. The other two axes, carton clip height and preopening guide are adjusted vertical and are accessed in the same manner through another screen display.

By touching screen 90, the operator can select which of the axes is to be adjusted, and see the current target and actual position of the axis. The axis selected gives its current position in millimeters. It can be adjusted by pushing the appropriate arrow buttons 94 or 97 to move 1 millimeter in or out or right respectively, or double arrow buttons 95 or 96 move 10 millimeters in or out respectively.

A changeover cycle is performed through operator interface 56. A changeover button 98 in the upper right of screen display 91 has a code which represents one particular combination of bottles and cartons. During the first run of a particular combination, all the axes can be adjusted individually and their positions stored in the machine control computer under this code. The next time that this particular combination is to be run, this code is recalled from a list of codes for numerous combinations of bottles and cartons. With the desired code displayed in the changeover button 98, a push of the changeover button 98 resets all the axes simultaneously to the positions stored under that code. This makes adjusting the machine for changeover to a different combination of bottle and carton a simple, fast, and repeatable operation.

Operator interface 56 works through a PLC which controls drives for each axis. The PLC has a set of ladder logic instructions in it.

Appendix 1 lists a portion of the ladder logic instructions. Rungs 0–25 are overhead programming that applies to all eight axes. Rungs 26–43 are specific instructions for the magazine width adjustment axis. Specific instructions for other axes are follow the same pattern as those for the magazine width adjustment and are omitted.

Figure 7:
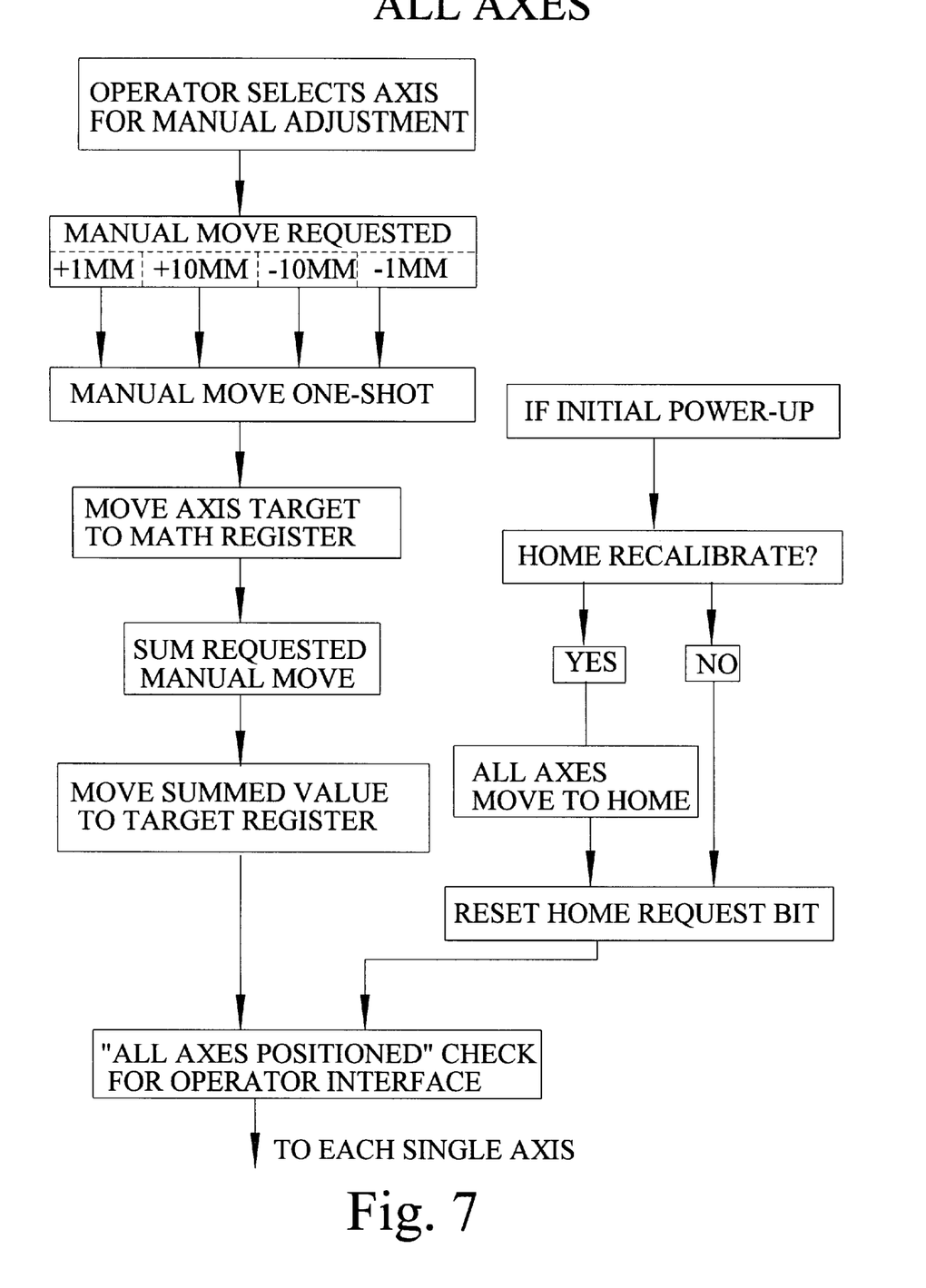
FIG. 7 is a flow diagram for programmable logic controller programming pertaining to all axes shown in FIG. 1.
Figure 8A:
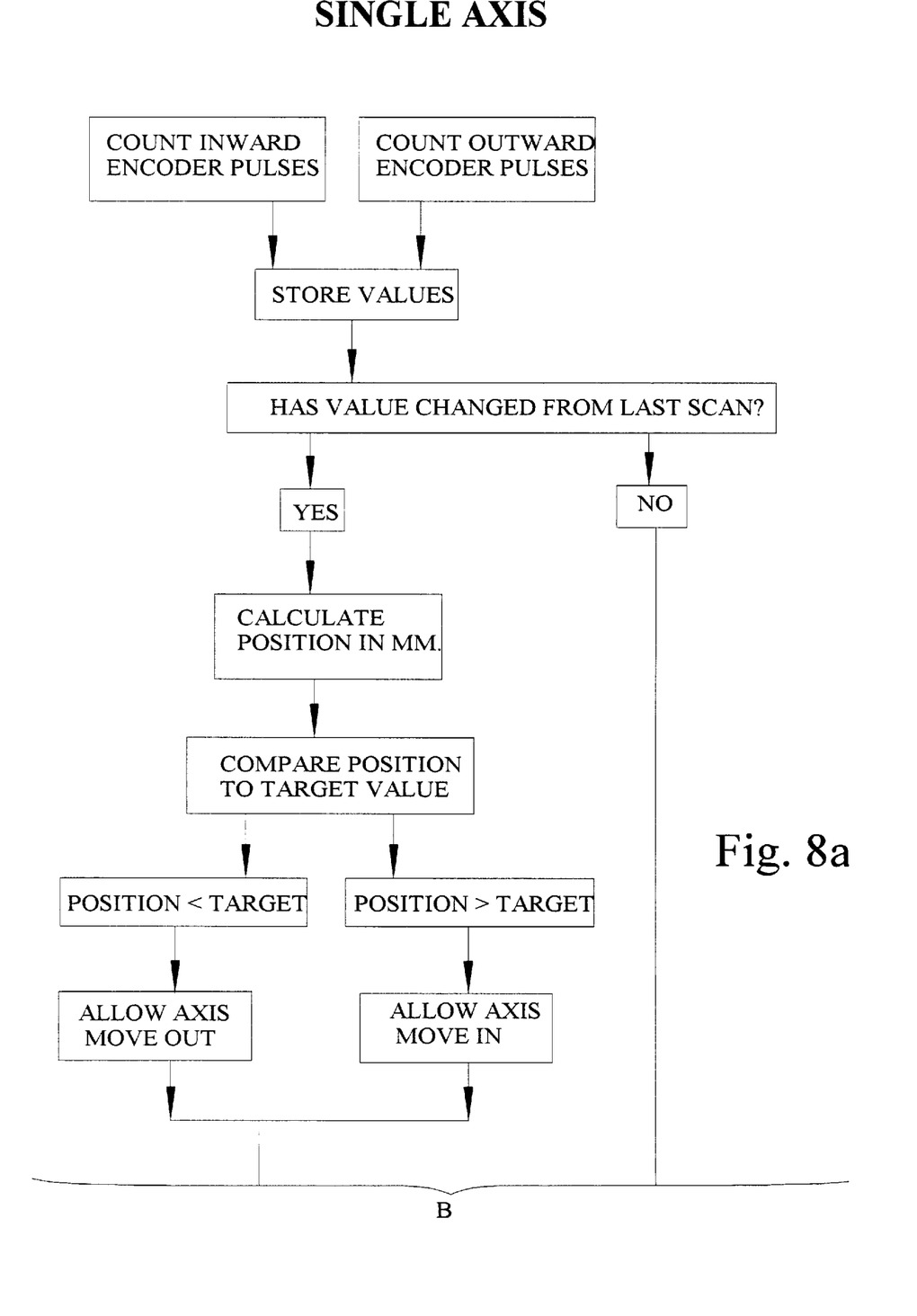
FIGS. 8a and 8b are a flow diagram for the programmable logic controller programming pertaining to the carton magazine axis shown in FIG. 1.
Figure 8B:
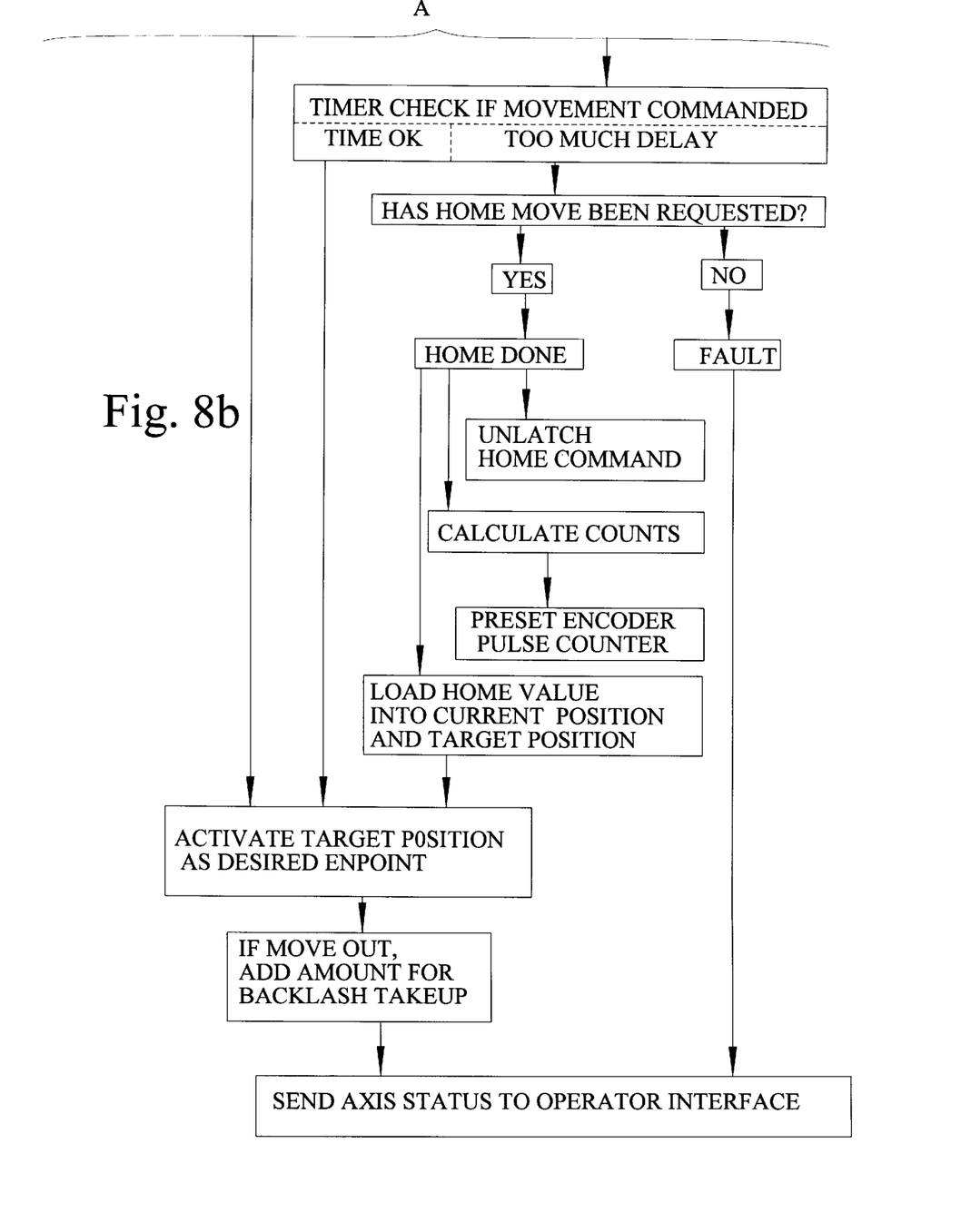

Referring to FIGS. 7, 8a and 8b, the ladder logic programming of Appendix 1 is illustrated by these flow charts. The PLC scans through the entire programming sequence approximately every twenty milliseconds and directs the appropriate action based on changes detected from the previous scan. As long as power to the machine stays on, the programming keeps track of the position of each axis, and adjustments can be made manually or automatically based on previously stored positional data. Referring to FIG. 7, a manual move is done by the operator selecting an axis to be moved by touching the desired iconic button on the screen display (FIG. 6) and touching one of the four arrow buttons to jog the selected axis. Whenever a valid manual move is entered by the operator pushing one of the four arrow buttons, a "one-shot" is delivered (rung 1 of Appendix 1) to the subsequent programming steps. The target value of the selected axis is moved to a math register (rungs 2–9), the math (+1 mm, –1 mm, +10 mm, or –10 mm) is performed (rungs 10–13) and the math result is moved back to the target register of the selected axis (rungs 14–21).

If power has been shut off to the machine for some reason, upon power up and the first scan of the programming steps, a bit is latched so that the operator is asked to decide if all the axes need to have home position recalibrated (rung 22). The PLC retains the values in its registers during power-off, so if nothing has moved while power was off, and the operator knows the position of the axes is still correct, he can answer the question "no" and operation will continue using the current values. If, however, one or more axes have been moved during power off, or if the operator is not sure of the positional accuracy of an axis, the operator can answer the question "yes" and all axes will move out to their home positions. Rung 23 sets the home required bits for each axis. Rung 24 unlatches the home request bit latched in rung 22 after the question has been answered. When the current position equals the target position on all axes, all axes are in position and the machine is then ready for operation (rung 25).

Referring to FIG. 8a and 8b, individual axis programming is illustrated for the magazine width adjustment. Individual axis programming for all the other axes are identical except for the identification of the axis. As the ladder logic is scanned approximately every twenty milliseconds, if the screw is turning causing the encoder to turn, quadratured pulses are generated by the encoder at inputs A and B of the PLC. These pulses are counted by the PLC and the counts increase or decrease depending on whether the screw is moving the nut outward or inward. Inward and outward pulses are counted (rungs 26 and 27) and the value stored (rungs 28 and 29) for a change of state comparison in rungs 26 and 27 on the next scan. If the change of state comparison indicates a new encoder count, the axis position in millimeters is calculated and set into the current position register (rung 30). If the current position is less than the target value, a move out is allowed (rung 31). This rung also allows outward movement to outward stops if a home move has been requested, and has fault, E-stop, and travel limit checks in it. If the current position is greater than the target value, a move in is allowed (rung 32) with fault, E-stop, and travel limit checks.

A timer checks delay between encoder counts if movement has been commanded (rung 33). The timer will time out if movement has been commanded and a mechanical stop has been reached or some other malfunction, (mechanical jam or failed component) causes the motor to stall. The current limit of the DC drive will prevent mechanical or electrical damage. Then a fault will be generated and sent to the operator interface if a home move has not been requested (rung 34). If a home move has been requested and a move out has been active, the timer fault will be interpreted as the home stop being reached (rung 35) and the home command is unlatched, a value for home position is loaded into the current position and target position registers, and the counts for that position are calculated and the encoder pulse counter is set. Rung 36, allows for a cleanout position move from the operator interface, which is a move outward to allow access by personnel to remove misplaced articles or other debris. A cleanout position is preferably farther outward than all positions used by the axis during machine operation, except home position. All axes can simultaneously be moved to a predetermined cleanout position, then, when clean out is completed, move back to their position before cleanout. On machine 10, this cleanout move is not required and this rung is disabled.

The target position is activated as the desired endpoint (rung 37). If the move is outward, a backlash takeup step adds a predetermined amount if needed, dependent on mechanical slop, to the endpoint (rung 38). When that endpoint is reached, the current position is greater than the target value and the mode is changed to inward movement which then proceeds back to the target. If the move is not outward, the move proceeds directly to the target (rung 39). All moves are slow enough that there is no overshoot of target values. Therefore this control system is stable. The status of the axis is fed back to the operator interface which indicates whether the axis is running (rung 40), an upper limit has been reached (rung 41) or a lower limit has been reached (rung 42).

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A DC drive powered apparatus for automatically positioning a movable guide on a packaging machine, comprising:
    (a) at least one rail attached to said packaging machine;
    (b) a guide slidably attached to said at least one rail;
    (c) a rotatable lead screw attached to said machine and oriented parallel with said at least one rail;
    (d) a nut fixedly attached to said guide and threadably engaged with said lead screw;
    (e) an encoder mechanically coupled to said lead screw and electrically connected to a programmable logic controller to provide feedback to said programmable logic controller regarding rotation of said lead screw;
    (f) a DC electric motor having an output shaft, said motor running in a forward or reverse direction;
    (g) a DC drive electrically connected to said DC motor;
    (h) a gearbox having a worm drive input, a worm gear, and an output shaft, said worm drive input being attached to said output shaft of said motor, said output shaft of said gearbox having reduced speed and increased torque relative to said output shaft of said motor;
    (i) a mechanical coupling connecting said output shaft of said gearbox and said lead screw;
    (j) an outward mechanical stop on said machine interacting with said nut and said lead screw to mechanically limit outward travel of said nut on said lead screw, said stop providing a home position of said guide for said programmable logic controller when said outward travel of said nut is limited by said stop;
    (j) a programmable logic controller electrically connected to said encoder and to said DC drive, said programmable logic controller containing programming steps to direct said motor to run or stop to move said guide, said programming steps including at least one step which directs said motor to run or stop based on comparing a current position of said guide with a target position, said current position being calculated based on electrical signals from said encoder, said programming steps including at least one step which allows manual jogging of said guide by incrementally changing said target position, said programming steps including at least one step to define said home position for said guide, said programming steps including at least one step to take up mechanical backlash in said apparatus by overshooting of said target position by a predetermined amount when a move is made in an outward direction; and
    (k) an operator interface electrically connected to said programmable logic controller, whereby said motor runs to turn said lead screw to cause said guide to slide on said at least one rail by commands from said programmable logic controller based on input from said encoder and said operator interface to position said guide along said at least one rail.

2. An apparatus for positioning a element on a machine, comprising:
    (a) an element movably attached on said machine;
    (b) a direct current powered actuation mechanism connected to said element, said actuation mechanism selectively moving said element to a desired position, wherein said direct current powered actuation mechanism includes a DC electric motor having a rotating output shaft, said motor running in a forward direction and a reverse direction, and wherein said direct current powered actuation mechanism further includes:
        a DC drive electrically connected between said DC electric motor and said programmable control device, said DC drive selectively running and stopping said DC electric motor based on signals it receives from said programmable control device,
        a gearbox mechanically coupled to said output shaft of said electric motor, said gearbox having an output shaft with reduced speed and increased torque relative to said shaft of said electric motor, and
        a rotatable lead screw mechanically coupled to said output shaft of said gear box and a nut threadably engaging said lead screw, said nut being attached to said element, whereby as said lead screw is rotated by said electric motor and said gearbox, said nut travels along said lead screw to move said element to said target position; and
    (c) a programmable control device in electrical communication with said actuation mechanism, said programmable control device having programming steps, said programming steps directing said actuation mechanism to move said element to a target position said apparatus further comprising a mechanical coupling connecting said gearbox and said lead screw, wherein said coupling includes a first timing pulley connected to said lead screw, a second timing pulley attached to said output of said gearbox, and a timing belt operating between said first pulley and said second pulley to transfer torque between said second pulley and said first pulley.

3. The apparatus of claim 2, further comprising an operator interface in electrical communication with said programmable control device, said operator interface providing input signals from an operator to said programmable control device, said operator interface receiving signals from said programmable control device and using them to display information regarding status of said apparatus to an operator.

4. The apparatus of claim 2, further comprising an encoder mechanically coupled to said actuation mechanism and electrically connected to said programmable control device to provide feedback to said programmable control device regarding position of said actuation mechanism.

5. The apparatus of claim 2, wherein said programming steps include at least one step to take up mechanical backlash in said apparatus.

6. The apparatus of claim 5, wherein said mechanical backlash is taken up by overshooting said target position by a predetermined amount when a move is made in an outward direction.

7. The apparatus of claim 2, wherein said programming steps include at least one step to execute a move to a cleanout position.

8. The apparatus of claim 1, wherein said gearbox has a worm drive input and a worm gear connected to said output shaft of said gearbox, said worm drive input being attached to said output shaft of said motor.

9. The apparatus of claim 2 wherein said programming steps include at least one step which directs said actuation mechanism to run or stop based on comparing a current position of said element with said target position, said current position being calculated based on electrical signals from said encoder.

10. The apparatus of claim 9, wherein said programming steps include at least one step which allows manual jogging of said element by incrementally changing said target position.

11. The apparatus of claim 2, wherein said programming steps include at least one step which detects an unusually long time delay between a commanded move and a changing signal received from said encoder.

12. The apparatus of claim 2, further comprising a mechanical stop on said machine interacting with said actuation mechanism to mechanically limit outward travel of said actuation mechanism, said stop providing a home position of said element for said programmable control device when said outward travel of said actuation device is limited by said stop.

13. The apparatus of claim 12, further comprising an inward mechanical stop on said machine interacting with said nut and screw to mechanically limit inward travel of said nut on said screw.

14. The apparatus of claim 13, wherein said motor is of low enough power that said motor stalls when said outward stop or said inward stop is encountered without damaging any of said apparatus.

15. The apparatus of claim 2, further comprising a handwheel connected to said output shaft of said motor.

16. The apparatus of claim 2, wherein said programmable control device is a programmable logic controller.

17. The apparatus of claim 2, wherein said programming steps include at least one step to define a home position for said element.

18. The apparatus of claim 17, wherein said home position corresponds to a position of said element when said element has moved fully outward.

19. The apparatus of claim 11, wherein said time delay can correspond to a move to home being completed.

20. An apparatus for positioning a element on a machine, comprising:

(a) an element movably attached on said machine;

(b) a direct current powered actuation mechanism connected to said element, said actuation mechanism selectively moving said element to a desired position;

(c) a programmable control device in electrical communication with said actuation mechanism, said programmable control device having programming steps, said programming steps directing said actuation mechanism to move said element to a target position;

(d) a mechanical stop on said machine interacting with said actuation mechanism to mechanically limit outward travel of said actuation mechanism, said stop providing a home position of said element for said programmable control device when said outward travel of said actuation device is limited by said stop; and (e) an inward mechanical stop on said machine interacting with said nut and screw to mechanically limit inward travel of said nut on said screw.

21. An apparatus for positioning a element on a machine, comprising:

(a) an element movably attached on said machine;

(b) a direct current powered actuation mechanism connected to said element, said actuation mechanism selectively moving said element to a desired position; and (c) a programmable control device in electrical communication with said actuation mechanism, said programmable control device having programming steps, said programming steps directing said actuation mechanism to move said element to a target position, wherein said programming steps include at least one step to take up mechanical backlash in said apparatus, said mechanical backlash being taken up by overshooting said target position by a predetermined amount when a move is made in an outward direction.

22. An apparatus for positioning a element on a machine, comprising:

(a) an element movably attached on said machine;

(b) a direct current powered actuation mechanism connected to said element, said actuation mechanism selectively moving said element to a desired position;

(c) a programmable control device in electrical communication with said actuation mechanism, said programmable control device having programming steps, said programming steps directing said actuation mechanism to move said element to a target position; and (d) an encoder mechanically coupled to said actuation mechanism and electrically connected to said programmable control device to provide feedback to said programmable control device regarding position of said actuation mechanism, wherein said programming steps include at least one step which directs said actuation mechanism to run or stop based on comparing a current position of said element with said target position, said current position being calculated based on electrical signals from said encoder, and at least one step which allows manual jogging of said element by incrementally changing said target position.

23. An apparatus for positioning a element on a machine, comprising:

(a) an element movably attached on said machine;

(b) a direct current powered actuation mechanism connected to said element, said actuation mechanism selectively moving said element to a desired position, wherein said direct current powered actuation mechanism includes:

a DC electric motor having a rotating output shaft, a DC drive electrically connected between said DC electric motor and said programmable control device, said DC drive selectively running and stopping said DC electric motor, a gearbox mechanically coupled to said output shaft of said electric motor, said gearbox having an output shaft, a rotatable lead screw, and a mechanical coupling connecting said gearbox and said lead screw, wherein said coupling includes a first timing pulley connected to said lead screw, a second timing pulley attached to said output of said gearbox, and a timing belt operating between said first pulley and said second pulley to transfer torque between said second pulley and said first pulley; and (c) a programmable control device in electrical communication with said actuation mechanism, said programmable control device having programming steps, said programming steps directing said actuation mechanism to move said element to a target position.

* * * * *